US011862896B2

(12) United States Patent
Lim et al.

(10) Patent No.: US 11,862,896 B2
(45) Date of Patent: Jan. 2, 2024

(54) COMMON BOTTOM INPUT/OUTPUT INTERFACE DESIGN FOR MOBILE COMPUTER

(71) Applicant: ZEBRA TECHNOLOGIES CORPORATION, Lincolnshire, IL (US)

(72) Inventors: Sunghun Lim, Bethpage, NY (US); Edward M. Voli, East Setauket, NY (US); Dae Suk Noh, Vernon Hills, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/886,385

(22) Filed: May 28, 2020

(65) Prior Publication Data

US 2021/0376525 A1 Dec. 2, 2021

(51) Int. Cl.
*H01R 13/631* (2006.01)
*H01R 13/627* (2006.01)

(52) U.S. Cl.
CPC ....... *H01R 13/631* (2013.01); *H01R 13/6271* (2013.01)

(58) Field of Classification Search
CPC .......................... H01R 13/631; H01R 13/6271
See application file for complete search history.

(56) References Cited

U.S. PATENT DOCUMENTS 6,182,169 B1 1/2001 Force, Sr. et al.
6,955,484 B2 10/2005 Woodman
8,199,492 B2 6/2012 Liang et al.
8,570,718 B2 10/2013 Gao
9,148,474 B2 9/2015 Skvoretz
10,038,288 B2 * 7/2018 Choi ..................... G06F 1/1656
D836,638 S * 12/2018 Fountain ...................... D14/426
2003/0049955 A1 * 3/2003 Schilling ................ H05K 3/301 439/83
2003/0066856 A1 4/2003 Lehtonen
2005/0274755 A1 12/2005 Lee et al.
2006/0076381 A1 4/2006 Elizalde Rodarte et al.
2006/0138182 A1 6/2006 Carlsson
2008/0053848 A1 3/2008 Lin et al.
2012/0275025 A1 11/2012 Parrill
2014/0042294 A1 2/2014 Marzynski et al.

(Continued)

OTHER PUBLICATIONS

International Search Report and Written Opinion for International Application No. PCT/US2021/031289 dated Aug. 25, 2021.

*Primary Examiner* — Abdullah A Riyami
*Assistant Examiner* — Nader J Alhawamdeh

(57) ABSTRACT

A connector assembly for a mobile device includes a bottom plate adapted to be operably coupled with a mobile device, a connector region being operably coupled with the bottom plate, and at least one alignment member operably coupled with the back plate. The connector region is configurable in at least a first arrangement and a second arrangement. The at least one alignment member is positioned adjacent to the connector region. Further, the at least one alignment region aligns with the connector region and frictionally receives an accessory device. In the first arrangement, the connector region includes at least one charging pad. In the second arrangement, the connector region includes at least one data port.

14 Claims, 6 Drawing Sheets

(56) References Cited

U.S. PATENT DOCUMENTS

| | | | |
|---|---|---|---|
| 2015/0319520 | A1 | 11/2015 | Richardson et al. |
| 2016/0072933 | A1 | 3/2016 | Cox, III |
| 2016/0120295 | A1 | 5/2016 | Rowley |
| 2016/0344437 | A1 | 11/2016 | Gordon |
| 2017/0060209 | A1* | 3/2017 | Volek ...................... G06F 1/266 |
| 2018/0115128 | A1* | 4/2018 | Choi ..................... G06F 1/1632 |
| 2019/0126965 | A1* | 5/2019 | Bacallao ............... B62B 3/1428 |
| 2019/0334358 | A1* | 10/2019 | Fountain ............. H01M 50/209 |

* cited by examiner

COMMON BOTTOM INPUT/OUTPUT INTERFACE DESIGN FOR MOBILE COMPUTER

BACKGROUND OF THE INVENTION

A number of devices may be used in warehouse and similar settings to assist with locating, retrieving, and/or scanning items. For example, mobile computing devices may be used to obtain items and relevant information. It is oftentimes desirable to employ mobile computers that can accept a number of various accessories, and as a result, such mobile computers oftentimes require several varying hardware interfaces that communicate with the various accessories. Such different hardware interfaces oftentimes occupy both internal and external space of the mobile computing device, and can be cumbersome to switch between interfaces to use desired accessories. Further, the process of switching the interface to accommodate different accessory devices may be time consuming and lead to operational inefficiencies.

Accordingly, there is a need for improved accessories having improved functionalities.

SUMMARY

According to a first aspect, a connector assembly for a mobile device includes a bottom plate adapted to be operably coupled with a mobile device, a connector region being operably coupled with the bottom plate, and at least one alignment member operably coupled with the back plate. The connector region is configurable in at least a first arrangement and a second arrangement. The at least one alignment member is positioned adjacent to the connector region. Further, the at least one alignment region aligns with the connector region and frictionally receives an accessory device. In the first arrangement, the connector region includes at least one charging pad. In the second arrangement, the connector region includes at least one data port.

In some examples, the at least one charging pad includes a pogo pin. In some examples, the at least one charging pad may include a surface-mount technology (SMT) connector operably coupled with a flex board assembly. In some examples, the at least one data port is in the form of a USB-c port.

In some approaches, the connector region is configurable in a third arrangement having at least one charging pad and at least one data port. The connector region may be removably coupled with the bottom plane, and in some examples, the at least one electrical connector may be flush mounted with the bottom plate. In other examples, the at least one electrical connector may be recess mounted with the bottom plate.

In some examples, the at least one alignment member includes a recess formed in the bottom plate. Further, the alignment member may include an uninterrupted sidewall surface. In some examples two alignment members may be provided which are disposed on opposite ends of the connector region.

In some examples, the accessory device may include a charging cradle, a payment module, a trigger handle, a dimensioning module, a hand strap, or a heads-up display. Other examples are possible.

In some examples, a locking region may be provided which is disposed on an edge of the bottom plate. The locking region may include a channel extending in a longitudinal direction and an engagement member positioned at an end of the channel. The engagement member may additionally include a protrusion extending into the channel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
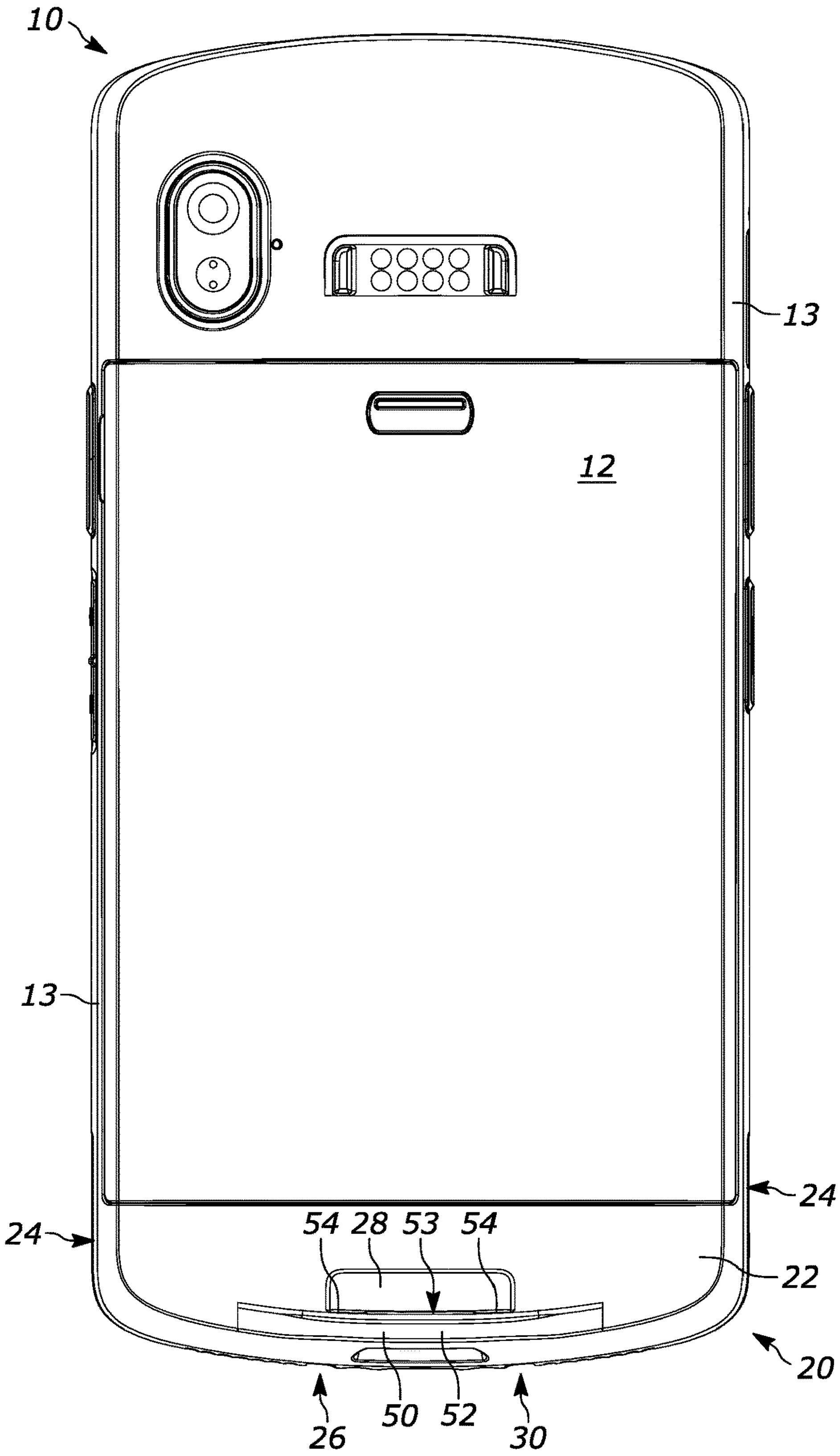
FIG. 1 is a rear elevation view of an example mobile device having an example connector assembly coupled thereto in accordance with this disclosure.
Figure 2:
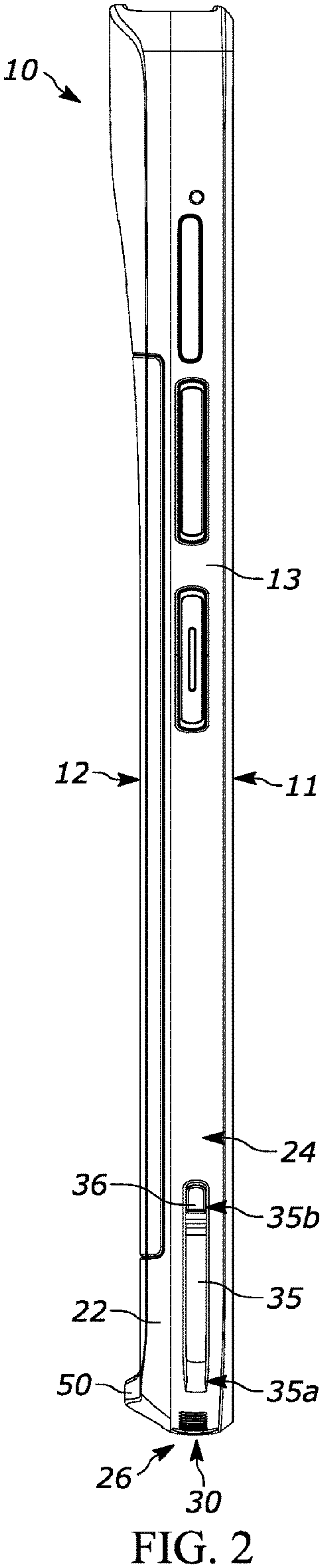
FIG. 2 is a left side elevation view of the example mobile device having the example connector assembly of FIG. 1 in accordance with this disclosure.
Figure 3:
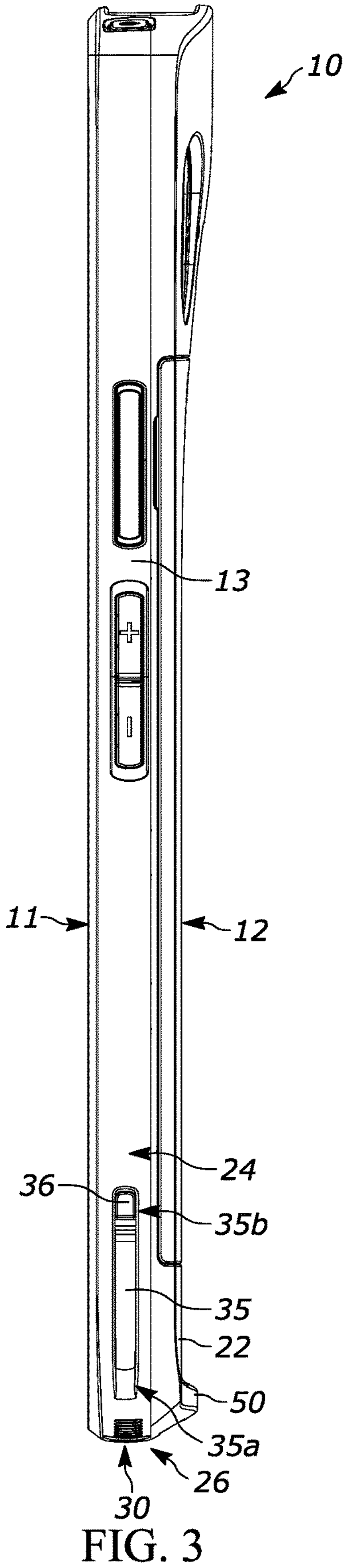
FIG. 3 is a right side elevation view of the example mobile device having the example connector assembly of FIGS. 1 and 2 in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, reference numeral 10 generally identifies an example mobile device capable of performing a number of functions such as, for example, scanning items including barcodes or labels, capturing images, receiving and/or processing electronic payments, obtaining measurements, and any number of additional functions. The device 10 may be provided in a number of varying form factors, models, arrangements, or SKUs depending on the desired application and/or use, but may still retain the same overall shape and size across these different arrangements.

Further, the device 10 may be modified to be used in varying environments where any number of accessory devices may be implemented. As a non-limiting example, the accessory device or devices may be any number of a charging cradle, a payment module, a trigger handle, a dimensioning module, a heads-up display, a hand strap and/or other securement feature. Other examples are possible. These different accessory devices may have different electrical requirements for transmitting signals, data and/or power, and as such, to accommodate the use of the device 10 with varying accessory devices, the device 10 includes an input/output (I/O) interface in the form of a connector assembly 20 operably and removably coupled with the mobile device 10. The connector assembly 20 (as well as any additional connector assemblies described herein) may be coupled with the desired mobile device 10 model or arrangement as needed.

The connector assembly 20 includes a bottom plate 22 in the form of a body operably coupled with the mobile device 10, a connector region 30 operably coupled with the bottom plate 22, any number of alignment members 40 operably coupled with the bottom plate 22, and a towel bar 50 operably coupled with the bottom plate 22. Briefly, the mobile device 10 includes a front end 11, a back end 12, and a sidewall 13 extending between the front and back ends 11, 12. In some examples, the bottom plate 22 is dimensioned to frictionally engage the mobile device 10 (e.g., via a snap-fit connection). More specifically, the bottom plate 22 may include outer ends 24 and a lower end 26 dimensioned to be placed over and frictionally engage the sidewall 13 of the mobile device 10. Other examples of suitable coupling mechanisms are possible.

Figure 4:
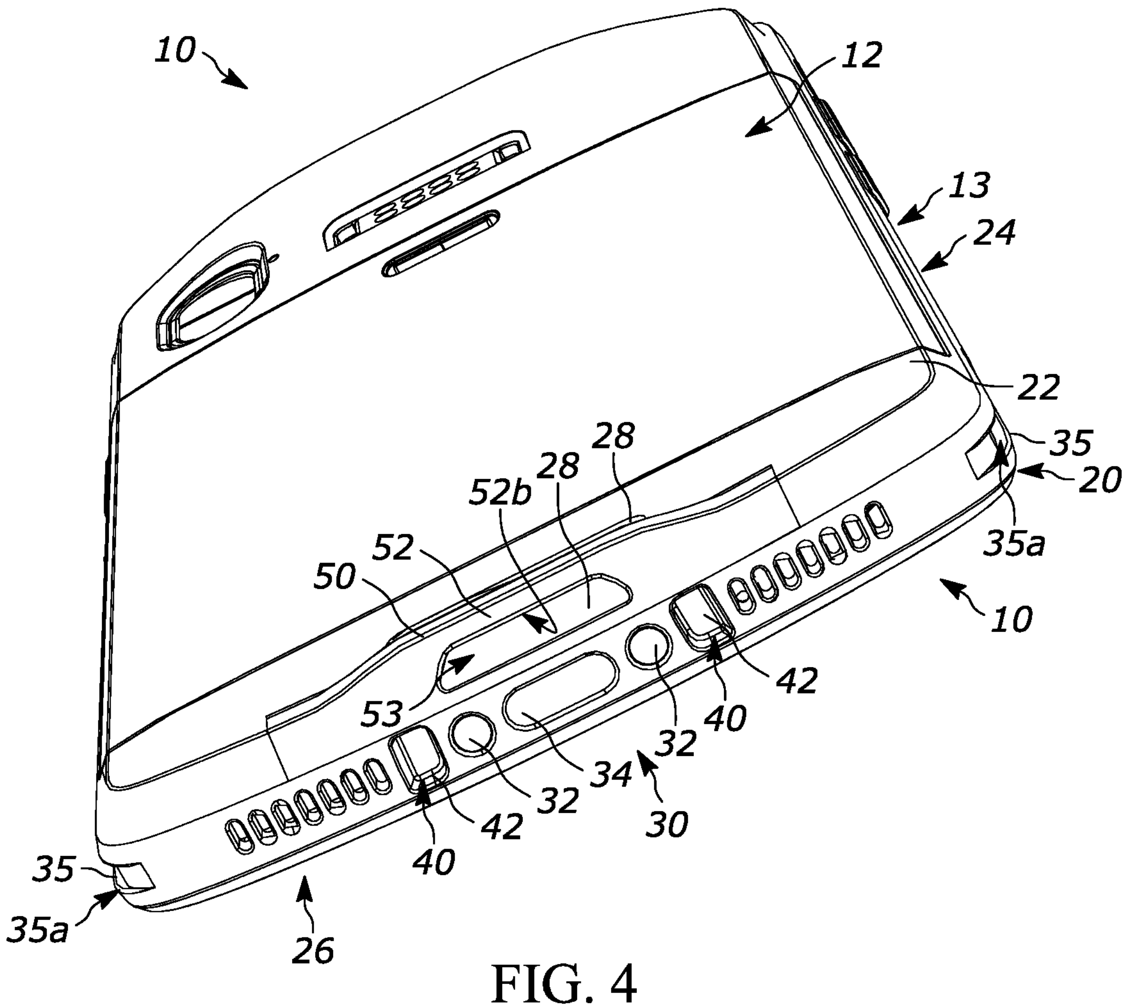
FIG. 4 is a lower rear perspective view of the example connector assembly of FIGS. 1-3 in accordance with this disclosure.
Figure 5:
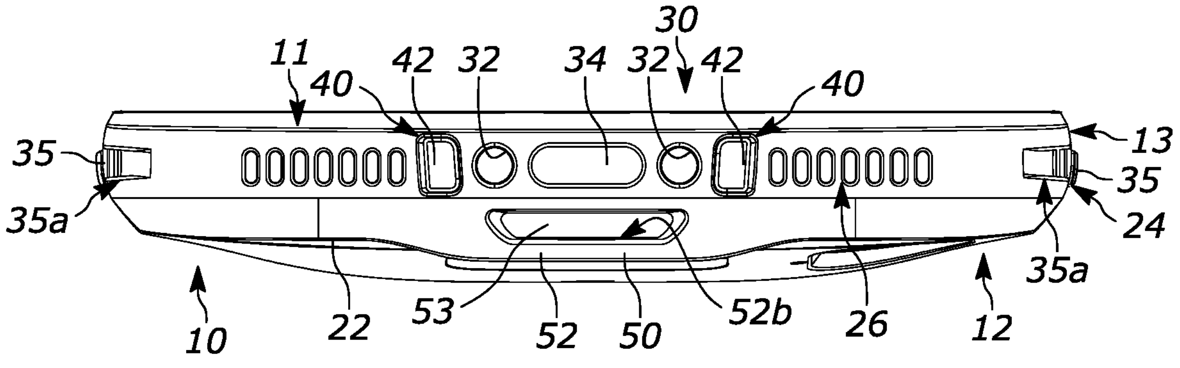
FIG. 5 is a lower plan view of the example connector assembly of FIGS. 1-3 in isolation in accordance with this disclosure.

As previously noted, the connector region 30 is operably coupled with the bottom plate 22. More specifically, as illustrated in FIGS. 4 and 5, the connector region 30 may be disposed on the lower end 26 of the bottom plate 22. In some examples, the connector region 30 is flush-mounted with the lower end 26 of the bottom plate 22, and as such, the connector region 30 does not protrude outwardly therefrom. In other examples, the connector region 30 may be recessed relative to the lower end 26 of the bottom plate 22. The connector region 30 is configurable in any number of different arrangements where any number of charging pads or electrical connectors 32 may be implemented thereon. Generally, the connector region 30 is arranged to provide an electrical coupling between a desired accessory device and the mobile device 10, and may be configured in a multitude of arrangements. More specifically, the electrical connectors 32 may provide charging power to the mobile device 10. In the illustrated example of FIGS. 4 and 5, the connector region 30 includes two electrical connectors 32. However, in other examples, the connector region 30 may include no electrical connectors or any other number of electrical connectors 32 as desired. In some examples, the electrical connectors 32 may be in the form of pogo pins that are coupled with a circuit board of the mobile device 10 via a surface-mount technology (SMT) whereby a flex board electrically connects the circuit board with the electrical connectors 32. However, other examples of suitable electrical connectors 32 are possible.

Depending on the number of electrical connectors 32 needed to electrically connect the desired accessory device with the mobile device 10, the electrical connectors 32 may be selectively removed from or coupled with the connector region 30. These electrical connectors 32 may be coupled with the connector region 30 via a frictional connection, a snap-fit connection, a fastener or fasteners, and the like. Other examples of coupling mechanisms are possible. In some examples, a cover may be provided to cover or block off areas of the connector region 30 that are not occupied by an electrical connector 32.

The connector region 30 may further include at least one data port 34 operably coupled with the mobile device 10 to allow the accessory devices to transmit data to and/or receive data from the mobile device 10. In some examples, the data port 34 is in the form of a USB-c connector, but in other examples, different connectors may be used. It is appreciated that the data port 34 may also be capable of providing charging power to the mobile device 10 and/or may be capable of providing power to the accessory device coupled thereto.

The connector assembly 20 additionally includes any number of locking regions 35 disposed along the outer ends 24 of the bottom plate 22. The locking regions 35 are in the form of an elongated groove or channel extending in a longitudinal direction having a proximal end 35*a* and a distal end 35*b*. An engagement member 36 is positioned at the distal end 35*b* of the locking region 35. In some examples, the engagement member 36 includes a protrusion extending inwardly into the channel. In other words, in these examples, the protrusion may be of a greater depth than the remainder of the channel. So configured, an accessory device having a corresponding notch or tab (not illustrated) may be inserted into the locking region 35 to couple the accessory device with the bottom plate 22 (and thus the mobile device 10), while restricting relative movement therebetween until a sufficient urging force is exerted to remove the notch or tab from the engagement member 36.

As previously noted, the connector assembly 20 further includes at least one alignment member 40 operably coupled with the lower end 26 of the bottom plate 22. In the illustrated example, two alignment members 40 are provided that are positioned adjacent to the connector region 30 on opposite ends thereof, but in other examples, any number of alignment members 40 may be provided on the bottom plate 22. Generally, the alignment members 40 are provided to align any electrical connectors and/or data ports disposed on the accessory device such as, for example, a cradle with the electrical connectors 32 and/or data ports 34 of the connector region 30. In the illustrated examples, the alignment members 40 are in the form of recesses 42 extending inwardly into the lower end 26 of the bottom plate 22 having a generally rectangular prismatic or cylindrical shape. Other examples are possible. Notably, the alignment members 40 do not include an undercut region to further retain the accessory device. Rather, the recess 42 is shaped to receive a corresponding protrusion formed on the accessory device and form a friction fit therewith while permitting relative axial movement therebetween. The sidewalls of the recess 42 includes a sidewall surface that is uninterrupted or continuous such that it is arranged to prevent relative, non-axial movement between the connector assembly 20 (and thus, the mobile device 10) and the accessory device. In other words, in the illustrated examples, the recess 42 is free of additional depressions, notches, and/or catches, thus the recess 42 may be used primarily for alignment of the device 10 and the desired accessory (e.g., the electrical connectors 32). Advantageously, by incorporating accessory devices in the form of protruding posts, such posts may protect the electrical connectors 32 from side impact that may potentially bend or otherwise damage the electrical connectors 32. Further, the recess 42 may prevent reverse insertion of the device 10 into the accessory device (e.g., a charging cradle) by having a non-symmetrical shape. Such reverse insertion of the device 10 into the accessory may potentially damage the device 10 and/or the electrical connectors 32.

Notably, the locking regions 35 include an undercut region to help secure the accessory to the device 10. So configured, the alignment members 40 may cooperate with the locking regions 35 to securely retain and align the accessory device relative to the mobile device.

As previously noted, the connector assembly 20 may be provided in a number of different arrangements or configurations. For example, depending on the desired accessory device, different bottom plates 22 may be coupled with the mobile device 10. More specifically, in a first arrangement, a bottom plate 22 may be provided having a connector region 30 including any number of electrical connectors 32 and no data ports. In a second arrangement, a bottom plate 22 may be provided having a connector region 30 including a data port 34 and no electrical connectors. In a third arrangement, a bottom plate 22 may be provided having a connector region 30 including any number of electrical connectors 32 as well as a data port 34. In any of these arrangements, the locking region 35 may be provided as desired. Accordingly, instead of selectively removing electrical connectors from the connector region as needed to accommodate different accessory devices, a user may simply replace the first bottom plate 22 with a second bottom plate to accommodate a different accessory device.

The connector assembly 20 may further include a towel bar 50 coupled with the bottom plate 22 to provide additional engagement with accessory devices. Generally, the towel bar 50 has a body 52 in the form of a quadrilateral cross section that defines a first engaging surface **52*a* and a second engaging surface 52*b*. The body 52 extends outwardly from and across the bottom plate 22 to define an opening 53 therebetween. More specifically, in the illustrated example, the bottom plate 22 further includes a recessed region 28 across which the body 52 of the towel bar 50** extends.

Figure 6:
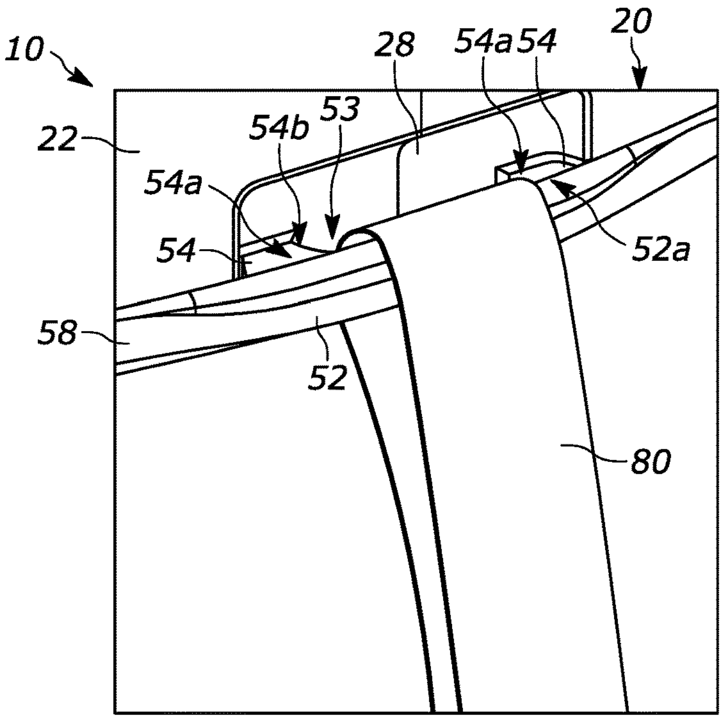
FIG. 6 is a rear perspective view of an example towel bar for use with the example connector assembly of FIGS. 1-5 having a first example accessory coupled therewith in accordance with this disclosure.
Figure 7:
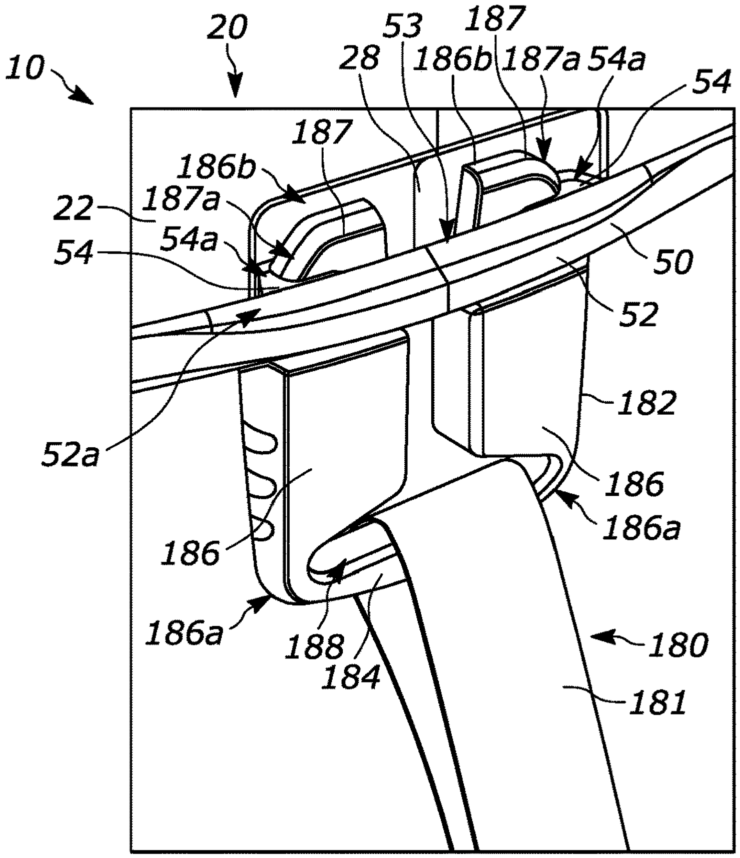
FIG. 7 is a rear perspective view of the example towel bar for use with the example connector assembly of FIGS. 1-5 having a second example accessory coupled therewith in accordance with this disclosure.
Figure 11:
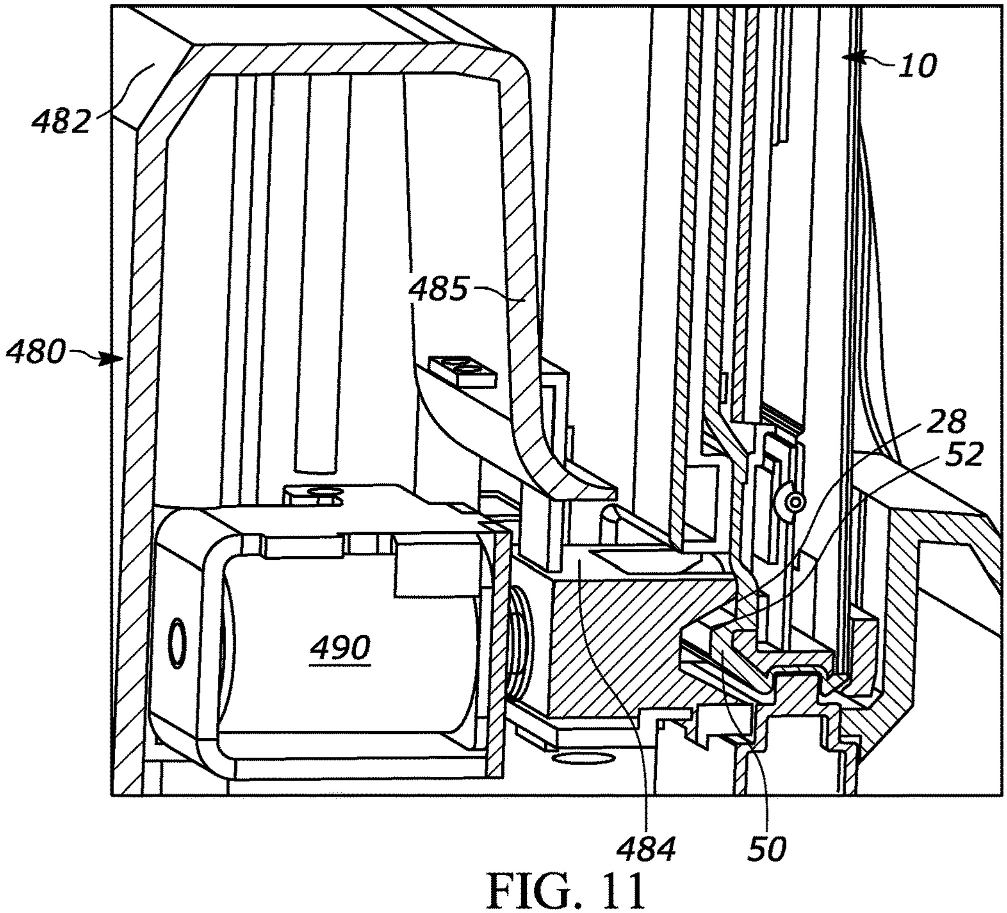
FIG. 11 is a cross-sectional view of the sixth example accessory of FIG. 10 coupled with the example towel bar in accordance with this disclosure.

As best illustrated in FIGS. 6, 7, and 11, in some examples, the towel bar 50 may further include any number of locking ledges 54 positioned between the first engaging surface **52*a* of the body 52 and the recessed region 28. In the illustrated example, the locking ledge or ledges 54 define a first engaging surface 54*a* and a second engaging surface 54*b* positioned adjacent to the first engaging surface 54*a*. In the illustrated example, the first engaging surface 54*a* of the locking ledge 54 extends along a plane that is generally parallel to the first engaging surface 52*a* of the body 52, but in other examples, the first engaging surface 54*a* of the locking ledge 54 may not extend along a plane that is generally parallel to the first engaging surface 52*a* of the body 52. Further, in the illustrated example, the first engaging surface 54*a* of the locking ledge 54 is recessed relative to the first engaging surface 52*a* of the body 52, but in other examples, the first engaging surface 52*a*, 54*a*** may be coplanar. Other examples are possible.

As previously noted, the towel bar 50 may be used to couple various accessory devices with the connector assembly 20 (and thus the mobile device 10). For example, as illustrated in FIG. 6, a first example accessory 80 in the form of a hand strap or neck lanyard is provided that may be inserted through the opening 53 and wrapped around the body 52 of the towel bar 50. In this arrangement, the hand strap may engage the first and second engaging surface **52*a*, 52*b* of the body 52 to be retained. Though not illustrated, the hand strap 80 may include any number of fasteners or securement features to close the loop in order to be securely retained with the towel bar 50**.

With reference to FIG. 7, a second example accessory 180 is provided in the form of a hand strap or neck lanyard 181 coupled with a quick-release buckle 182 to selectively couple with the towel bar 50 and the back plate 22. The quick-release buckle 182 may be partially or entirely constructed from a resilient material capable of selectively being urged inwardly. More specifically, the quick-release buckle 182 includes a base 184 and two resilient arms 186 extending therefrom. Each of the resilient arms 186 includes a first end **186*a* (coupled with the base 184) and a second end 184*b* having a coupling portion 187. In the illustrated example, the coupling portions 187 are in the form of outwardly-facing hooks having a curved or angled upper surface 187*a*. Further, the quick-release buckle 182 includes an opening 188 to receive the hand strap 181**.

As illustrated in FIG. 7, to secure the quick-release buckle 182 with the bottom plate 22 of the connector assembly 20 (and thus the mobile device 10), the second end **186*b* of each of the resilient arms 186 are positioned near the opening 53 and the recess 28 formed in the bottom plate 22. In this orientation, the curved upper surface 187*a* of the coupling portion 187 abuts against a lower surface of the locking ledge 54. Upon urging the quick-release buckle 182 into the opening 53, the curved upper surface 187*a* of the coupling portion 187 slides against the lower surface of the locking ledge 54, and the resilient arms 186 are urged inwards. Upon the coupling portion 187 clearing the second engaging surface 54*b* of the locking ledge 54, the resilient arms 186 move outwardly to their original configuration, whereby the coupling portions 187 engage and couple with the first engaging surface 54*a* (and/or the second engaging surface 54*b*) of the respective locking ledge 54 to retain the quick-release buckle 182 and prevent the quick-release buckle 182 from being pulled out of the opening 53. When it is desired to remove the quick-release buckle 182, a user may grasp and squeeze the sides of the resilient arms 186 inwardly, thus decoupling the coupling portions 187 from the locking ledge 54. The user may then pull the quick-release buckle 182 out of the opening 53**.

Figure 8:
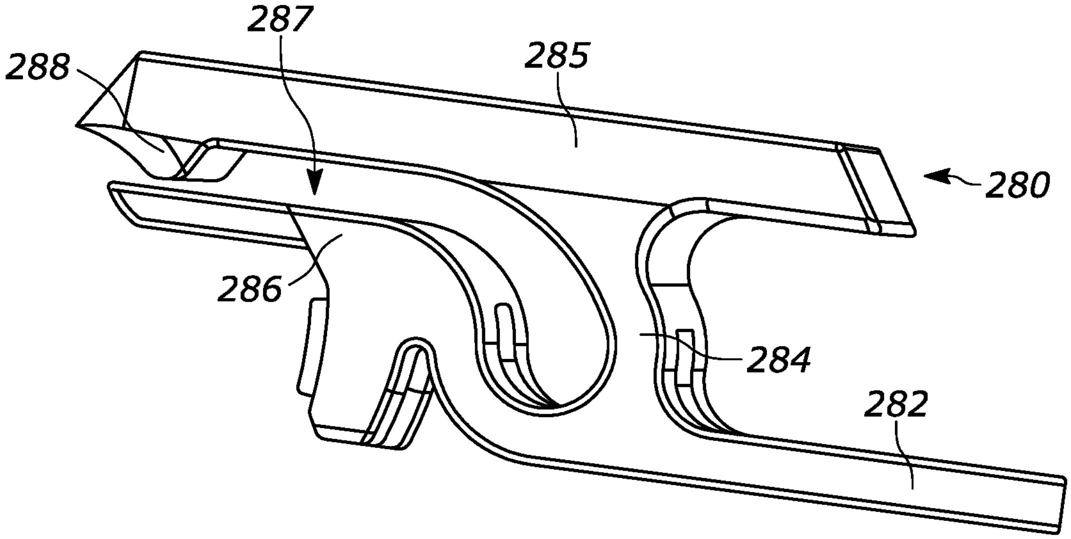
FIG. 8 is a perspective view of a third example accessory for coupling with the example towel bar of FIGS. 1-5 in accordance with this disclosure.

With reference to FIG. 8, a third example accessory 280 is provided in the form of an alternative quick-release buckle 282 capable of selectively coupling with the bottom plate 22. The quick-release buckle 282 includes a body 284, a first arm 285, a second arm 286, and an opening 287 formed therebetween. The first arm 285 includes a tab or protrusion 288. During operation, the towel bar 50 is positioned within the opening 287 such that the second arm 286 is disposed through the opening. The tab or protrusion 288 may then engage the towel bar 50 and operate as a catch to prevent the towel bar 50 from being removed from the opening 287.

Figure 9:
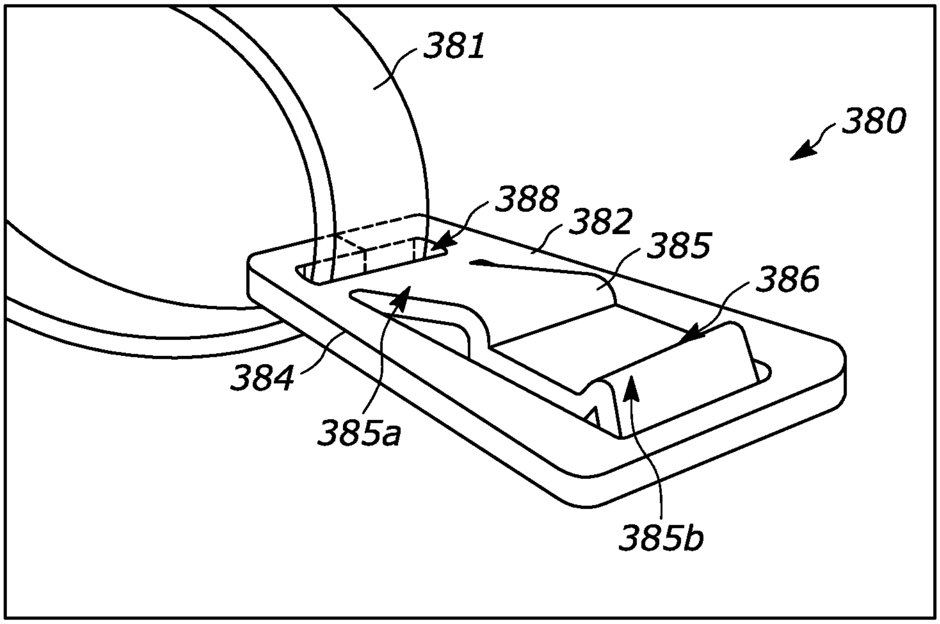
FIG. 9 is a perspective view of a fourth example accessory for coupling with the example towel bar of FIGS. 1-5 in accordance with this disclosure.

With reference to FIG. 9, a fourth example accessory 380 is provided in the form of an alternative quick-release buckle 382 capable of selectively coupling with the bottom plate 22. The quick-release buckle 382 includes a body 384 and an arm 385 coupled with the body 384 at a first end **385*a* thereof and further including a second end 385*b* and a recessed region 386. Further, the quick-release buckle 382 may include an opening 388 to receive a hand strap 381**.

During operation, the second end 385*b* of the arm 385 is positioned adjacent to the towel bar 50, and the quick-release buckle 382 is urged into the opening 53. The towel bar 50 then urges the arm 385 downwards until being positioned within the recessed region 386, which serves to retain and to prevent the towel bar 50 from being decoupled from the quick-release buckle 382. The arm 385 may be urged away from the towel bar 50 to remove the quick-release buckle 382 from the opening 53.

Figure 10:
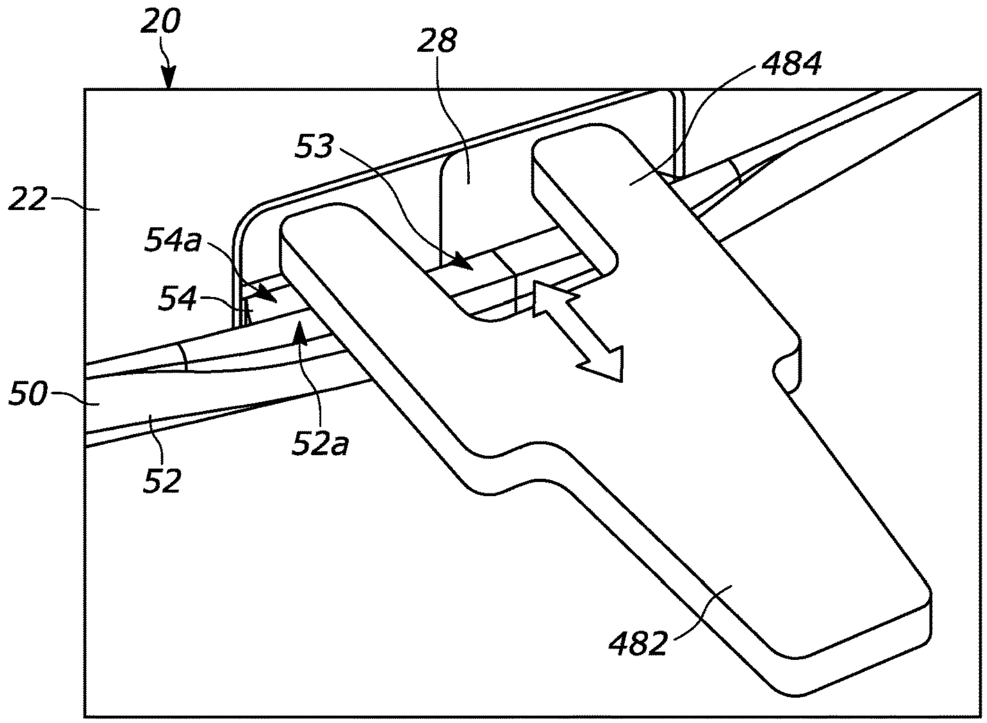
FIG. 10 is a rear perspective view of the example towel bar for use with the example connector assembly of FIGS. 1-5 having a fifth example accessory coupled therewith in accordance with this disclosure.

With reference to FIGS. 10 and 11, a fifth example accessory 480 in the form of a cradle 482 capable of engaging the connector region 30 and, in some examples, to electrically couple with the mobile device 10. In this example, the cradle 482 includes an engaging arm 484 operably coupled with a cradle wall 485 (see FIG. 11). It is appreciated that the cradle 482 may include any number of additional features such as, for example, a coil 490 disposed within a solenoid bracket and operably coupled with a solenoid spring, and the like.

The engaging arm 484 may be configured to move along with the cradle wall 485 in a direction away from the towel bar 50 during coupling of the cradle 482 with the mobile device 10. Upon clearing the towel bar 50, the engaging arm 484 may return to its resting configuration whereby the engaging arm 484 engages and/or abuts the first engaging surface 52*a* of the body 52 of the towel bar 50 to prevent relative motion between the mobile device 10 and the cradle 482. In this configuration, a portion of the engaging arm 484 may be disposed within the recessed region 28 formed on the bottom plate 22. Further, in some examples, the engaging arm 484 may additionally include a protrusion disposed at an end thereof to further engage the second engaging surface 52*b* of the body 52 of the towel bar 50 and/or the first or second engaging surfaces 54*a*, 54*b* of the locking ledges.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A connector assembly for a mobile device, the connector assembly comprising:

a bottom plate adapted to be operably coupled with a mobile device;

a connector region being operably coupled with the bottom plate, the connector region being configurable in one of a first arrangement or a second arrangement; and at least one alignment member being operably coupled with the bottom plate and positioned adjacent to the connector region, the at least one alignment member adapted to align with the connector region and to frictionally receive an accessory device;

wherein in the first arrangement, the connector region includes a first number of charging pads, and in the second arrangement, the connector region includes a second number of charging pads, wherein the connector region is removably coupled with the bottom plate and the mobile device.

2. The connector assembly of claim 1, wherein at least one charging pad includes a pogo pin.

3. The connector assembly of claim 2, wherein at least one charging pad includes a surface-mount technology (SMT) connector operably coupled with a flex board assembly.

4. The connector assembly of claim 1, the connector region further comprises at least one data port.

5. The connector assembly of claim 1, wherein the connector region is configurable in a third arrangement having at least one charging pad and at least one data port.

6. The connector assembly of claim 1, wherein the connector region is flush mounted with the bottom plate.

7. The connector assembly of claim 1, wherein the connector region is recess mounted with the bottom plate.

8. The connector assembly of claim 1, wherein the at least one alignment member includes a recess formed in the bottom plate.

9. The connector assembly of claim 8, wherein the at least one alignment member includes an uninterrupted sidewall surface.

10. The connector assembly of claim 9, further comprising two alignment members being disposed on opposite ends of the connector region.

11. The connector assembly of claim 1, wherein the accessory device includes a charging cradle, a payment module, a trigger handle, a dimensioning module, a hand strap, or a heads-up display.

12. The connector assembly of claim 1, further comprising a locking region disposed on an edge of the bottom plate.

13. The connector assembly of claim 12, wherein the locking region includes a channel extending in a longitudinal direction and an engagement member positioned at an end of the channel.

14. The connector assembly of claim 13, wherein the engagement member includes a protrusion extending into the channel.

* * * * *